United States Patent
Shah

(10) Patent No.: US 6,961,465 B2
(45) Date of Patent: Nov. 1, 2005

(54) SYSTEM AND METHOD FOR EFFICIENT DETERMINATION OF RECOGNITION INITIAL CONDITIONS

(75) Inventor: Kishan B Shah, Mountain View, CA (US)

(73) Assignee: Canon Kabushiki Kaisha, Tokyo (JP)

(*) Notice: Subject to any disclaimer, the term of this patent is extended or adjusted under 35 U.S.C. 154(b) by 632 days.

(21) Appl. No.: 09/750,602

(22) Filed: Dec. 28, 2000

(65) Prior Publication Data

US 2002/0085756 A1 Jul. 4, 2002

(51) Int. Cl.[7] .............................................. G06K 9/00
(52) U.S. Cl. ....................................... 382/181; 382/190
(58) Field of Search ................................ 382/181, 190, 382/224, 228, 229, 226, 227, 272, 290, 301, 382/309, 310, 317, 270, 299, 191

(56) References Cited

U.S. PATENT DOCUMENTS

| | | | | |
|---|---|---|---|---|
| 5,572,604 A | * | 11/1996 | Simard | 382/224 |
| 5,719,951 A | * | 2/1998 | Shackleton et al. | 382/118 |
| 5,729,637 A | * | 3/1998 | Nicholson et al. | 382/282 |
| 6,108,437 A | * | 8/2000 | Lin | 382/118 |
| 6,125,208 A | * | 9/2000 | Maier et al. | 382/228 |
| 6,137,905 A | * | 10/2000 | Takaoka | 382/173 |
| 6,614,917 B1 | * | 9/2003 | Phillips | 382/103 |
| 6,754,369 B1 | * | 6/2004 | Sazawa | 382/105 |

* cited by examiner

Primary Examiner—Yon J. Couso
(74) Attorney, Agent, or Firm—Fitzpatrick, Cella, Harper & Scinto

(57) ABSTRACT

A system (200) and method creates (312) a reduced-resolution version of an image and uses the reduced resolution version to identify (324) recognition initial conditions. The recognition initial conditions are then used (326) on the original version of the image to recognize objects such as characters in the image.

16 Claims, 3 Drawing Sheets

SYSTEM AND METHOD FOR EFFICIENT DETERMINATION OF RECOGNITION INITIAL CONDITIONS

FIELD OF THE INVENTION

The present invention is related to computer software and more specifically to computer software for optical recognition of objects.

BACKGROUND OF THE INVENTION

Computer software can be used to recognize digital representations of objects. For example, optical character recognition software can be used to recognize digital representations of character objects, typically obtained by scanning a printed page, segmenting the page into characters, and identifying characteristics of each character. Rules are used to narrow the choice of characters to a smaller range of characters, and a confidence level is assigned to each character in the smaller range. The character with the highest confidence level may be selected as the recognized character.

Some computer software for object recognition uses initial conditions for the recognition. The use of initial conditions allows the software to be tuned in a laboratory to particular conditions simulating the environment of anticipated operation of the software. Before the software is shipped as part of a product, the initial conditions are fixed at a constant level that yielded the optimum recognition in the laboratory simulation for that product.

For example, an initial condition may be that if a segment of a page believed to correspond to a character is 30 percent black, it is most likely an 'o' or an 'e', and likely not a 'c'. Conventional pattern matching or other techniques may then be employed to identify the character. Using the initial conditions, the algorithm can start by attempting to identify if the segment corresponds to one of the most likely characters and if a threshold recognition confidence level is achieved, the user of the techniques need not attempt to compare the confidence level of additional characters, saving time in the recognition process.

It would be desirable to have the initial condition selection process vary for each set of objects, such as characters on the page, rather than selecting a single set of initial conditions and using that same set for all objects. This would allow the initial conditions to change for every page or part of a page, causing the initial conditions to be optimized for every circumstance. In the example above, different fonts or styles (e.g. bold, italics, etc.) could have different ideal values for initial conditions. As fonts change across the page, the initial conditions would ideally change to match the fonts.

While it is possible to make several attempts at recognizing the objects, such as characters in the file, using different initial conditions for each attempt, and then selecting the attempt that yields the highest recognition confidence, such a process would add too much time to the recognition process to be practical. Although computing power increases every year, because users prefer to use the additional computing power to process images of higher resolution rather than improve the accuracy of the recognition, making several attempts at recognizing an image could take too long to be useful.

What is needed is a method and apparatus that can optimally set the initial conditions of an optical recognition without significantly adding time to the recognition.

SUMMARY OF INVENTION

A method and apparatus receives a digitized representation of an image at a first resolution, then produces a lower resolution version of the image. The method and apparatus then attempts multiple recognitions on the reduced-resolution version of the image using different initial conditions for each recognition and records the confidence level of the attempt. The initial conditions that yielded the highest confidence level on the attempt using the lower resolution version can then be used to perform the recognition on the higher-resolution version of the image.

DETAILED DESCRIPTION OF THE PREFERRED EMBODIMENTS

Figure 1:
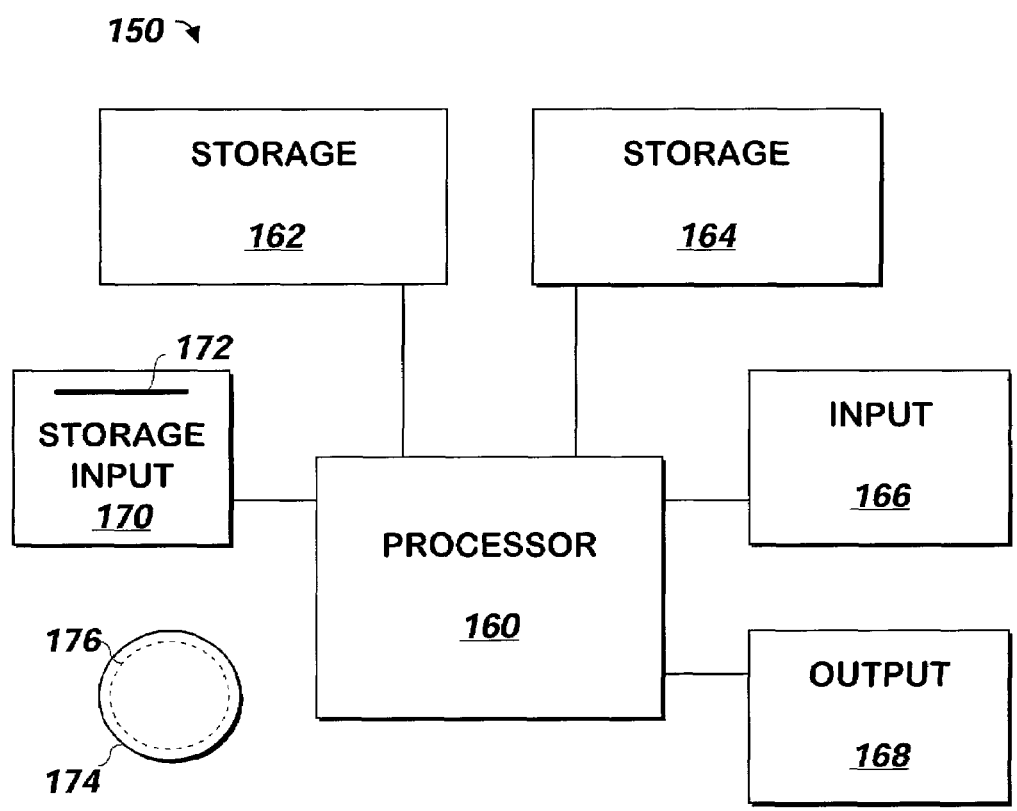
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard, mouse, scanner, digital camera or any or all of these allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Intel Pentium/Celeron compatible computer such as the model 6540C commercially available from Hewlett Packard Corporation of Palo Alto, Calif., running the Windows operating system commercially available from Microsoft Corporation of Redmond, Wash., although other systems may be used.

Figure 2:
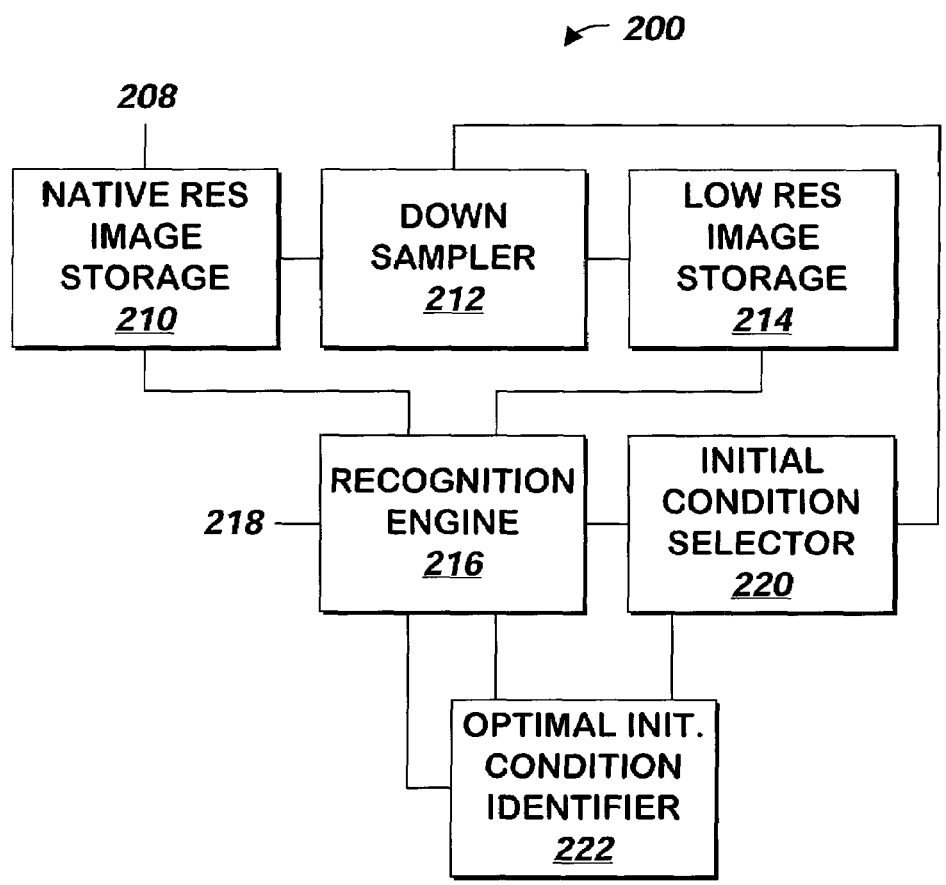
FIG. 2 is a block schematic diagram of a system for identifying optimal initial conditions for optical object recognition according to one embodiment of the present invention.

Referring now to FIG. 2 a system 200 for identifying optimal initial conditions for optical object recognition is shown according to one embodiment of the present invention. The description below uses characters as the objects, however, objects can be shapes, people, three-dimensional items or any other object.

Initial conditions may include, without limitation, some or all of: threshold greyscale values for conversion of greyscale pixels to black or white values (e.g. above the threshold, convert to black, below the threshold, convert to white), rules for initial guesses of recognition objects (e.g. as described above), threshold greyscale values for conversion of greyscale pixels to white to eliminate noise (e.g. below a threshold value, treat as white to eliminate noise), determination of skew correction, determination of type of object (characters, lines or pictures), and other initial conditions.

Native resolution image storage 210 receives at input 208 a digitized representation of an image from an optical scanning device such as a scanner or digital camera. Native resolution image storage 210 contains conventional memory such as random access memory or other types of storage and stores the digitized representation of the image in this storage. As native resolution image storage 210 receives an image, it signals downsampler 212.

In one embodiment, the digitized representation of the image stored in native resolution image storage 210 is made up of an array of pixels at a resolution. For example, the digitized representation of the image may be represented with a resolution of 1200×1200 pixels per inch. Thus, an 8.5 by 11 inch document may be represented by 134,640,000 pixels. The digitized representation of the image may be stored using conventional compression techniques, so the number of pixels stored in native resolution image storage 210 may be less than the 134,640,000 pixels for that size document, even though that many pixels are represented by the digitized representation of the image. Each of the pixels may have one or more values. A greyscale image may have a greyscale value. A color image may have a pair of values: one representing luminance or intensity, and another value representing chromiance or color.

Downsampler 212 retrieves the digitized representation of the image from native resolution image storage 210, reduces the resolution, and stores the result into low resolution image storage 214. Downsampler 212 reduces the resolution by selecting a set of pixels, computing an average representation of the value or values of the pixels in the set, and then representing the entire set of pixels selected by a single pixel (or a number of pixels fewer than the number of pixels in the set) having the average value or values of the set of pixels selected. If the digitized representation of the image is compressed, downsampler 212 decompresses the image before reducing the resolution and may optionally compress the result prior to storage into low resolution image storage 214.

For example, if the resolution is 1200 dpi and it is desired to reduce the resolution to 300 dpi, downsampler 212 selects from native resolution image storage 210 a set of sixteen pixels from the upper left hand corner of the image, four pixel columns wide and four pixel rows tall, and averages the values from these pixels to produce a single pixel, which is output to low resolution image storage 214. Low resolution image storage 214 contains conventional storage such as memory or disk storage. The four pixels adjacent to these in each of the same four rows are selected and the process is repeated by downsampler 212 and so on until the end of the row is reached. When the end of the row is reached, downsampler 212 selects the next four rows and repeats the process described above for these rows. It isn't necessary to proceed-step-by-step in this fashion, nor is it necessary to average the values. For example, the values may be smoothed using conventional smoothing techniques. When downsampler 212 has completed reducing the resolution of the digitized representation of the image, downsampler 212 signals initial condition selector 220.

Initial condition selector 220 selects an initial set of one or more initial conditions it internally stores and passes them to recognition engine 216. Recognition engine is any conventional recognition engine such as an optical character recognition engine that can accept a set of initial conditions, identify a segment of an image, and provide the one or more characters recognized at the highest confidence level and also supply that confidence level, which may be a value between 0 and 1. Recognition engine 216 performs conventional optical character recognition techniques using the initial conditions provided by initial condition selector 220 on the reduced resolution version of the digitized representation of the image that is stored in low resolution image storage 214. In one embodiment, recognition engine 216 segments the image into characters or words and then attempts to recognize the character or word using conventional optical character resolution techniques on each segment. Optical character recognition is described in Bunke & Wang, ed., *Handbook of Character Recognition and Document Image Analysis* (1997 World Scientific Publishing Co. Pte. Ltd, Singapore, ISBN 981-02-2270-X). Other forms of object recognition may also be used such as handwriting recognition, described in S Impedoio and J Simon, eds. *From Pixels to Features III"* (1992 Elsevier Science Publishers, B.V., Amsterdam). Source code for an optical character recognition engine is publicly available from the National Institute of Standards and Technology, Gaithersburg, Md., 20899 and is described in Garris et al, "Public Domain Optical Character Recognition", *Proceedings, SPIE* Volume 2422, pp2–15, and this engine may be suitably modified as described herein.

Initial condition selector 220 selects another set of initial conditions and passes them to recognition engine 216 and signals recognition engine to repeat the recognition process described above on the same segment of the image it just processed, and recognition engine 216 complies with the request. This process may be repeated a number of times, each time with a different set of initial conditions.

In one embodiment, each time another set of initial conditions is selected and provided by initial condition selector 220, the value of only one of the initial conditions is varied until several different values of that initial condition have been selected and provided to recognition engine 216 by initial condition selector 220. When all possible values of that initial condition have been provided or when an acceptable value has been identified, that initial condition is set to a particular value and the value of a different initial condition is varied, and so forth until all the initial conditions have been varied.

For example, assume two initial conditions, initial condition 1 and initial condition 2, with possible values of A1, B1, C1 and D1 for initial condition 1 and values A2 and B2 for initial condition 2. The sets of initial conditions provided by initial condition selector 220 could be (A1, A2), (B1, A2), (C1, A2), (D1, A2), (A1, B2), (B1, B2), (C1, B2), (D1, B2).

It is not necessary to provide all possible values: for example, a binary search technique may be used or a discrete set of initial condition combinations may be provided with multiple initial conditions changing from one set of initial conditions to the next. For example, the initial condition values provided by initial condition selector 220 could be limited to (A1, A2), (B1, B2), (C1, A2), (D1, B2).

Each time the initial conditions are provided to recognition engine, initial condition selector 220 provides those initial conditions or an indicator of the initial conditions to optimal initial condition identifier 222. In addition, recognition engine provides the confidence level of the character recognition to optimal initial condition identifier. Optimal initial condition identifier 222 records the initial conditions and the confidence level so that the optimal value for the initial conditions may be identified by selecting values of initial conditions that yield the highest confidence levels.

In one embodiment, optimal initial condition identifier 222 identifies the optimal value for a initial condition by choosing the value of a initial condition that yielded the highest confidence level for the recognition performed by recognition engine 216. In another embodiment, if the confidence level exceeds a threshold, such as 0.95, optimal initial condition identifier 222 signals initial condition selector 220 to select no further values of that initial condition. This way, if an acceptable value is reached, the system 200 does not continue searching for a better one: the acceptable value is used as the optimal value.

In one embodiment, when an optimal value for a particular initial condition has been identified, optimal initial condition identifier 222 provides the value of the optimal initial condition to initial condition selector 220 to use in all remaining initial condition selections it makes as described above. In another embodiment, a preset value may be used in place of the optimal initial condition for use in attempting to identify the optimal value of a different initial condition.

When the optimal values of all of the initial conditions have been identified as described above, optimal initial condition identifier 222 signals recognition engine with the optimal values of all initial conditions. Recognition engine 216 selects the segment of the digitized representation of the image in native resolution image storage 210 that corresponds to the segment in low resolution image storage 214 that was used to select the optimal initial conditions and performs an optical character recognition of the segment from native resolution image storage 210. In one embodiment, recognition engine 216 uses the same character recognition techniques that it used on the lower resolution version of the image to recognize the higher resolution version of the image. In another embodiment, a different character recognition technique is used for the different resolution versions of the image. In one embodiment, when recognition engine completes the optical character recognition of the higher resolution image, it outputs at output 218 a representation of the object or objects recognized and signals initial condition selector 220 so that the process may be repeated on a different segment of the image. The representation of the object or objects recognized may be an ASCII character as well as font descriptions and the like or may be a code for a particular object, such as a rubber band or a circle. In another embodiment, recognition engine 216 attempts to recognize the next segment from native resolution image storage 210 using the same initial conditions as the last segment, and only signals initial condition selector 220 to begin the process of initial condition selection again if the confidence level of the recognition for the segment falls significantly below the confidence level of the last recognition or falls below a certain preset value.

Figure 3:
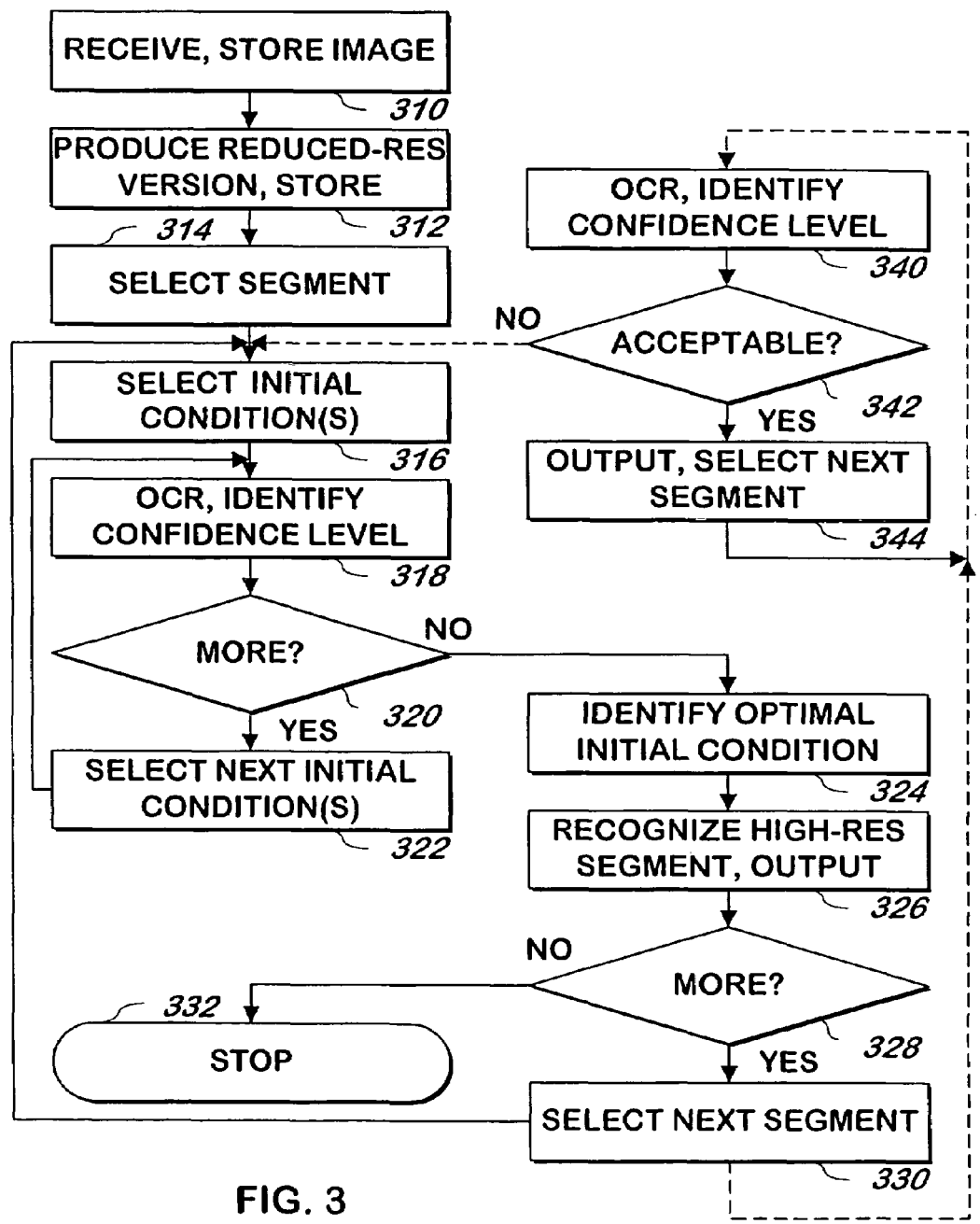
FIG. 3 is a flowchart illustrating a method of identifying optimal initial conditions for optical object recognition according to one embodiment of the present invention.

Referring now to FIG. 3, a method of identifying optimal initial conditions for optical object recognition is shown according to one embodiment of the present invention. The description below uses characters as objects, but an object may also be noncharacter things as described above. An digital representation of an image is received and stored 310 at a first resolution, such as a native resolution of a scanning device as described above. A reduced-resolution version of some or all of the image received in step 310 is produced and stored 312 as described above. A segment is selected 314, either from the image received in step 310 or the version of the image produced in step 312. An initial set of initial conditions are selected 316 as described above. An attempt is made to recognize one or more objects such as characters in the segment from the reduced resolution version of the image, and the highest confidence level obtained from the attempt is produced 318. If there are additional combinations of initial conditions 320, a different combination is selected as described above 322 and the method continues at step 318 using the different combination of initial conditions. When the selection and testing the recognition from the combinations of initial conditions is completed as described above 320, the optimal initial conditions are identified 324 as described above. The segment of the image received in step 310 is then recognized using the optimal initial conditions 326 and the character or characters recognized from the segment of the image received in step 310 are output 326. If there are more segments 328, the next segment is selected 330 and the method continues at step 316 using the selected segment, and otherwise, the method terminates 332.

In an alternate embodiment of the present invention illustrated by the dashed lines in the figure, when the next segment is selected at step 330, instead of continuing at step 316, the method continues at step 340. At step 340, the segment from the digitized representation of the image received in step 310 is recognized and a confidence level is identified. If the confidence level is acceptable as described above 342, the character or characters recognized in step 340 are output and the next segment is selected 344, and the method continues at step 340. Otherwise 342, the method continues at step 316 to identify values of initial conditions to use for the segment on which the recognition was attempted in step 340 but acceptable recognition confidence was not achieved.

What is claimed is:

1. A method of recognizing at least one object in a digitized representation of an image, comprising the steps of:

receiving the digitized representation of the image, the representation having a first resolution;

creating a reduced-resolution version of the image responsive to the digitized representation of the image, the reduced-resolution version of the image having a second resolution lower than the first resolution;

providing a plurality of sets of initial conditions, the initial conditions including at least a condition for character recognition-processing of the image;

for each of the sets of initial conditions, identifying each confidence level of character recognition by first character recognition-processing of the reduced resolution version of the image having the second resolution based on each of the sets of initial conditions, each of the sets of initial conditions including a threshold value to binarize an image;

selecting an optimal set of initial conditions from the plurality of sets of initial conditions based on each confidence level identified in said identifying step, the optimal set of initial conditions including a threshold value to binarize the image; and second character recognition processing of the objects represented in the digitized representation of the image having the first resolution by using the optimal set of initial conditions selected in said selecting step.

2. The method according to claim 1, wherein said selecting step selects the optimal set from the plurality of sets of initial conditions based on a highest confidence level identified in said identifying step.

3. The method according to claim 1, wherein said selecting step selects the optimal set from the plurality of sets of initial conditions based on a confidence level exceeding a threshold.

4. The method according to claim 1, wherein said creating step creates the reduced resolution version of the image by calculating an average of a plurality of pixels of the digitized representation of the image having the first resolution.

5. The method according to claim 1, additionally comprising the step of recognizing at least one additional object represented in the digitized representation of the image, responsive to the value of at least one initial condition identified responsive to a confidence level exceeding a threshold.

6. The method according to claim 1, additionally comprising the steps of:
   attempting to recognize at least one additional object represented in the digitized representation of the image, responsive to the value of at least one initial condition identified, the attempting step comprising the step of producing a confidence level of the attempt; and
   responsive to the confidence level of the attempt below a threshold:
      repeating the identifying step; and
      recognizing the at least one object represented in the digitized representation of the image responsive to the value of each of the at least one initial condition identified during the repeating step.

7. A computer program product comprising a computer readable medium having computer executable program code embodied therein for recognizing at least one object in a digitized representation of an image, the computer program product comprising:
   computer executable program code configured to cause a computer to receive the digitized representation of the image, the representation having a first resolution;
   computer executable program code configured to cause a computer to create a reduced-resolution version of the image responsive to the digitized representation of the image, the reduced-resolution version of the image having a second resolution lower than the first resolution;
   computer executable program code configured to cause a computer to provide a plurality of sets of initial conditions, the initial conditions including at least a condition for character recognition-processing of the image;
   for each of the sets of initial conditions, computer executable program code configured to identify each confidence level of character recognition by first character recognition-processing of the reduced resolution version of the image having the second resolution based on each of the sets of initial conditions, each of the sets of initial conditions including a threshold value to binarize an image;
   computer executable program code configured to select an optimal set of initial conditions from the plurality of sets of initial conditions based on each confidence level identified, the optimal set of initial conditions including a threshold value to binarize the image; and
   computer executable program code configured to cause a computer to perform second character recognition-processing of the objects represented in the digitized representation of the image having the first resolution by using the optimal set of initial conditions selected.

8. The computer program product according to claim 7, wherein the computer executable program code is configured to cause a computer to select the optimal set from the plurality of sets of initial conditions based on a highest confidence level identified.

9. The computer program product according to claim 7, wherein the computer executable program code is configured to cause a computer to select the optimal set from the plurality of sets of initial conditions based on a confidence level exceeding a threshold.

10. The computer program product according to claim 7, wherein the computer executable program code is configured to cause a computer to create a reduced resolution version of the image creates by calculating an avenge of a plurality of pixels of the digitized representation of the image having the first resolution.

11. The computer program product according to claim 7, additionally comprising computer executable program code is configured to cause a computer to recognize at least one additional object represented in the digitized representation of the image, responsive to the value of at least one initial condition identified responsive to a confidence level exceeding a threshold.

12. The computer program product according to claim 7, additionally comprising:
   computer executable program code configured to cause a computer to attempt to recognize at least one additional object represented in the digitized representation of the image, responsive to the value of at least one initial condition identified, and configured to cause a computer to produce a confidence level of the attempt; and
   computer executable program code configured to cause a computer to, responsive to the confidence level of the attempt below a threshold:
      repeat the identifying step; and
      recognize the at least one object represented in the digitized
      representation of the image responsive to the value of each of the at
      least one initial condition identified during the repeat operation.

13. A system for recognizing objects, the system comprising:
   a downsampler having an input for receiving a representation of an image having a first resolution, the downsampler for producing and providing at an output thereof a reduced-resolution version of the image responsive to the representation of the image received at the downsampler input the reduced resolution version of the image having a second resolution lower than the first resolution; and
   a recognition engine having a first input coupled to the downsampler output for receiving the reduced-resolution version of the image and a second input for receiving the representation of the image, the recognition engine for recognizing at least one object in the digitized representation of the image by a method comprising the steps of:
   providing a plurality of sets of initial conditions, the initial conditions including at least a condition for character recognition-processing of the image;
   for each of the sets of initial conditions, identifying each confidence level of character recognition by first character recognition-processing of the reduced resolution version of the image having the second resolution based on each of the sets of initial conditions, each of the sets of initial conditions including a threshold value to binarize an image;

selecting an optimal set of initial conditions from the plurality of sets of initial conditions based on each confidence level identified in said identifying step, the optimal set of initial conditions including a threshold value to binarize the image; and second character recognition processing of the objects represented in the digitized representation of the image having the first resolution by using the optimal set of initial conditions selected in said selecting step.

14. The method according to claim 1, wherein the set of initial condition includes at least one of a threshold grayscale value, a determination of skew correction, and a determination of type of object.

15. The computer program according to claim 7, wherein the set of initial condition includes at least one of a threshold grayscale value, a determination of skew correction, and a determination of type of object.

16. The system according to claim 13, wherein the set of initial condition includes at least one of a threshold grayscale value, a determination of skew correction, and a determination of type of object.

* * * * *

UNITED STATES PATENT AND TRADEMARK OFFICE
CERTIFICATE OF CORRECTION

PATENT NO. : 6,961,465 B2  Page 1 of 1
DATED : November 1, 2005
INVENTOR(S) : Kishan B. Shah It is certified that error appears in the above-identified patent and that said Letters Patent is hereby corrected as shown below:

Column 3,
Line 12, "treat" should read -- treated --.

Column 5,
Line 11, "a" should read -- an --; and
Line 64, "An" should read -- A --.

Column 8,
Line 14, "creates" should read -- created --, and "avenge" should read -- average --; and
Line 49, "input" should read -- input, --.

Column 9,
Line 13, "condition" should read -- conditions --.

Column 10,
Lines 4 and 8, "condition" should read -- conditions --.

Signed and Sealed this

Eleventh Day of April, 2006

JON W. DUDAS
*Director of the United States Patent and Trademark Office*